(12) United States Patent
Lee

(10) Patent No.: US 7,715,507 B2
(45) Date of Patent: May 11, 2010

(54) INTERFERENCE CANCELLATION METHOD AND COMMUNICATION TERMINAL FOR THE SAME

(75) Inventor: Sang Yun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 757 days.

(21) Appl. No.: 11/426,931

(22) Filed: Jun. 27, 2006

(65) Prior Publication Data

US 2007/0019762 A1 Jan. 25, 2007

(30) Foreign Application Priority Data

Jun. 28, 2005 (KR) .................. 10-2005-0056534

(51) Int. Cl.
*H03D 1/04* (2006.01)
(52) U.S. Cl. .................. 375/346; 375/148; 455/296; 370/335; 370/342
(58) Field of Classification Search ............... 375/148, 375/346; 455/296; 370/335, 342
See application file for complete search history.

(56) References Cited

U.S. PATENT DOCUMENTS

| | | | | |
|---|---|---|---|---|
| 6,067,292 | A * | 5/2000 | Huang et al. ............... | 370/342 |
| 7,254,197 | B2 * | 8/2007 | Heo et al. .................. | 375/347 |
| 7,386,032 | B2 * | 6/2008 | Fitton et al. ............... | 375/147 |
| 2003/0021334 | A1 | 1/2003 | Levin et al. | |
| 2003/0142656 | A1 | 7/2003 | Padovani et al. | |
| 2003/0176201 | A1 | 9/2003 | Sih et al. | |
| 2003/0231702 | A1 | 12/2003 | Oates et al. | |
| 2004/0028013 | A1 | 2/2004 | Fitton et al. | |

FOREIGN PATENT DOCUMENTS

| | | |
|---|---|---|
| CN | 1539208 | 4/2007 |
| EP | 1 406 395 A | 4/2004 |
| EP | 1 569 356 A | 8/2005 |
| EP | 1569356 A1 | 8/2005 |
| JP | 1998-327126 | 12/1998 |
| JP | 2002-077010 | 3/2002 |
| JP | 2002-084258 | 3/2002 |
| JP | 2002536905 | 10/2002 |
| JP | 2004-529590 | 9/2004 |
| JP | 2005-516461 | 6/2005 |
| KR | 10-200000-17417 A | 3/2000 |
| KR | 10-2002-0062671 | 7/2002 |
| KR | 10-2005-0052783 | 7/2005 |
| WO | 95/17067 | 6/1995 |
| WO | 03/063376 | 7/2003 |

* cited by examiner

*Primary Examiner*—David C Payne
*Assistant Examiner*—Leon Flores
(74) *Attorney, Agent, or Firm*—Lee, Hong, Degerman, Kang & Waimey

(57) ABSTRACT

A method for canceling interference in multimedia broadcasts and a communication terminal for the same are provided. The method and the communication terminal reduce interference caused by a pilot channel to improve the reception quality of broadcast signals.

11 Claims, 3 Drawing Sheets

INTERFERENCE CANCELLATION METHOD AND COMMUNICATION TERMINAL FOR THE SAME

This application claims the benefit of the Korean Patent Application No. 10-2005-0056534, filed on Jun. 28, 2005, which is hereby incorporated by reference as if fully set forth herein.

BACKGROUND OF THE INVENTION

1. Field of the Invention

The present invention relates to multimedia broadcasts, and more particularly, to a method for canceling interference of multimedia broadcasts and a communication terminal for the same.

2. Discussion of the Related Art

A signal transmitted using Code Division Multiplexing (CDM) typically arrives at a receiver over a multipath channel. When signals are received over multipath channels, inter-channel or inter-signal interference occurs due to factors such as power difference between the channels. On the other hand, when signals are received over single-path channels, no inter-channel or inter-signal interference occurs since the channels do not affect each other. A number of interference cancellation techniques have been introduced to cancel such multi-path channel interference.

Recently, multimedia broadcasts have been introduced and implemented. Multimedia broadcasts can be defined as digital broadcasts that can provide audio, video, and data services with high quality sound and images and high quality stationary and mobile reception. Digital Multimedia Broadcasts (DMBs), which have also been introduced, are divided into terrestrial and satellite DMBs depending on whether a terrestrial or satellite band is used to transmit the DMB signals.

When CDM is used to transmit a broadcast signal, the broadcast signal arrives at a broadcast terminal over a multi-path channel. A transmitter transmits channels after coding and multiplexing the channels using orthogonal codes allocated to the channels. One example of orthogonal codes are Walsh codes.

Although channels have been described above as the subject of coding, multiplexing, and transmission, it is actually broadcast signals that are the subject to coding, multiplexing, and transmission. However, since expressions such as "to code channels", "to multiplex channels", and "to transmit channels" are commonly used, the terms "channels" and "signals" in the following description are used synonymously to describe the subject of coding, multiplexing, and transmission.

When CDM is used for broadcast signal transmission and a number of Walsh codes are used as orthogonal codes for the CDM transmission, a channel or signal that is coded using a Walsh code '0' is a pilot channel over which a pilot signal is transmitted. Channels coded using the remaining Walsh codes are CDM channels over which broadcast signals are transmitted.

The pilot signal transmitted over the pilot channel includes channel information such as channel gain and phase information and also includes information required for decoding, such as interleaving type or Fast Error Correction (FEC) information. The pilot channel uses higher power than CDM channels over which broadcast signals are transmitted since the pilot channel transmits more important information than CDM channels. For example, the pilot channel uses transmission power that is 3 dB higher than CDM channels. Because the pilot channel uses higher transmission power than CDM channels, information required for decoding, such as channel information, may be more accurately estimated from the pilot channel.

However, the pilot channel may cause interference with CDM channels since the pilot channel uses higher transmission power than CDM channels. Therefore, although the information required for decoding, such as channel information, can be more accurately estimated by increasing the transmission power of the pilot channel, the high transmission power of the pilot channel reduces the reception quality of broadcast signals that are received over CDM channels.

SUMMARY OF THE INVENTION

Accordingly, the present invention is directed to an interference cancellation method and a communication terminal for the same that substantially obviate one or more problems due to limitations and disadvantages of the related art. An object of the present invention is to provide an interference cancellation method and a communication terminal for the same, which are effective in canceling interference caused by a pilot channel to improve the reception quality of broadcast signals.

In one aspect of the present invention, an interference cancellation method is provided. The method includes decoding a signal received at a certain reception time, the received signal including a broadcast signal and a pilot signal, regenerating a pilot signal using the decoded pilot signal and removing a pilot signal from a signal received at a next reception time using the regenerated pilot signal.

It is contemplated that regenerating the pilot signal is performed according to channel information of a pilot channel. It is further contemplated that the method further includes measuring reception quality of the broadcast signal included in the received signal and determining whether to remove the pilot signal based on the measured reception quality.

It is contemplated that determining whether to remove the pilot signal includes comparing the measured reception quality with a plurality of thresholds. It is further contemplated that the plurality of thresholds include upper and lower thresholds that have hysteresis loop characteristics, the upper threshold being higher than the lower threshold.

It is contemplated that the method further includes ceasing the removal of the pilot signal when the measured reception quality exceeds the upper threshold. It is further contemplated that the method further includes repeating the removal of the pilot signal until the measured reception quality reaches the upper threshold.

In another aspect of the present invention, a communication terminal is provided. The communication terminal includes a decoding unit adapted to decode a signal received at a certain reception time, the received signal including a broadcast signal and a pilot signal, a regenerating unit adapted to regenerate a pilot signal using the decoded pilot signal from the decoding unit, a removal unit adapted to remove a pilot signal from the received signal, the pilot signal removed using the regenerated pilot signal and a measuring unit adapted to measure reception quality of a broadcast signal included in a signal received at a next reception time and control the regenerating unit according to the measured reception quality.

It is contemplated that the regenerating unit is further adapted to regenerate the pilot signal using channel information of a pilot channel. It is further contemplated that the regenerating unit is further adapted to mix an orthogonal code allocated to a pilot channel with the decoded pilot signal from the decoding unit and to regenerate the pilot signal by mixing information of the pilot channel with the mixed signal.

It is contemplated that the removal unit is further adapted to subtract the regenerated pilot signal from the signal received at the next reception time. It is further contemplated that the measuring unit is further adapted to control an operation of the removal unit according to the measured reception quality.

It is contemplated that the measuring unit is further adapted to determine whether to activate the regenerating unit by comparing the measured reception quality with a plurality of thresholds. It is further contemplated that the plurality of thresholds include upper and lower thresholds that have hysteresis loop characteristics, the upper threshold being higher than the lower threshold.

It is contemplated that the measuring unit is further adapted to deactivate the regenerating unit if the measured reception quality exceeds the upper threshold. It is further contemplated that the measuring unit is further adapted to activate the regenerating unit until the measured reception quality reaches the upper threshold.

In another aspect of the present invention, a method for reducing an interference for a broadcast signal is provided. The method includes decoding a received signal, the received signal including a broadcast signal and a pilot signal, regenerating a pilot signal by using at least a portion of the decoded signal and reducing an interference of the broadcast signal based on the regenerated pilot signal.

It is contemplated that the method further includes measuring a reception quality of the broadcast signal included in the received signal, comparing the measured reception quality with a plurality of thresholds and determining whether to reduce the interference of the pilot signal according to the comparison. It is further contemplated that the plurality of thresholds include upper and lower thresholds that have hysteresis loop characteristics, the upper threshold being higher than the lower threshold. Preferably, the method further includes repeating the reduction of the interference until the measured reception quality reaches the upper threshold and ceasing the reduction of the interference when the measured reception reaches the upper threshold.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
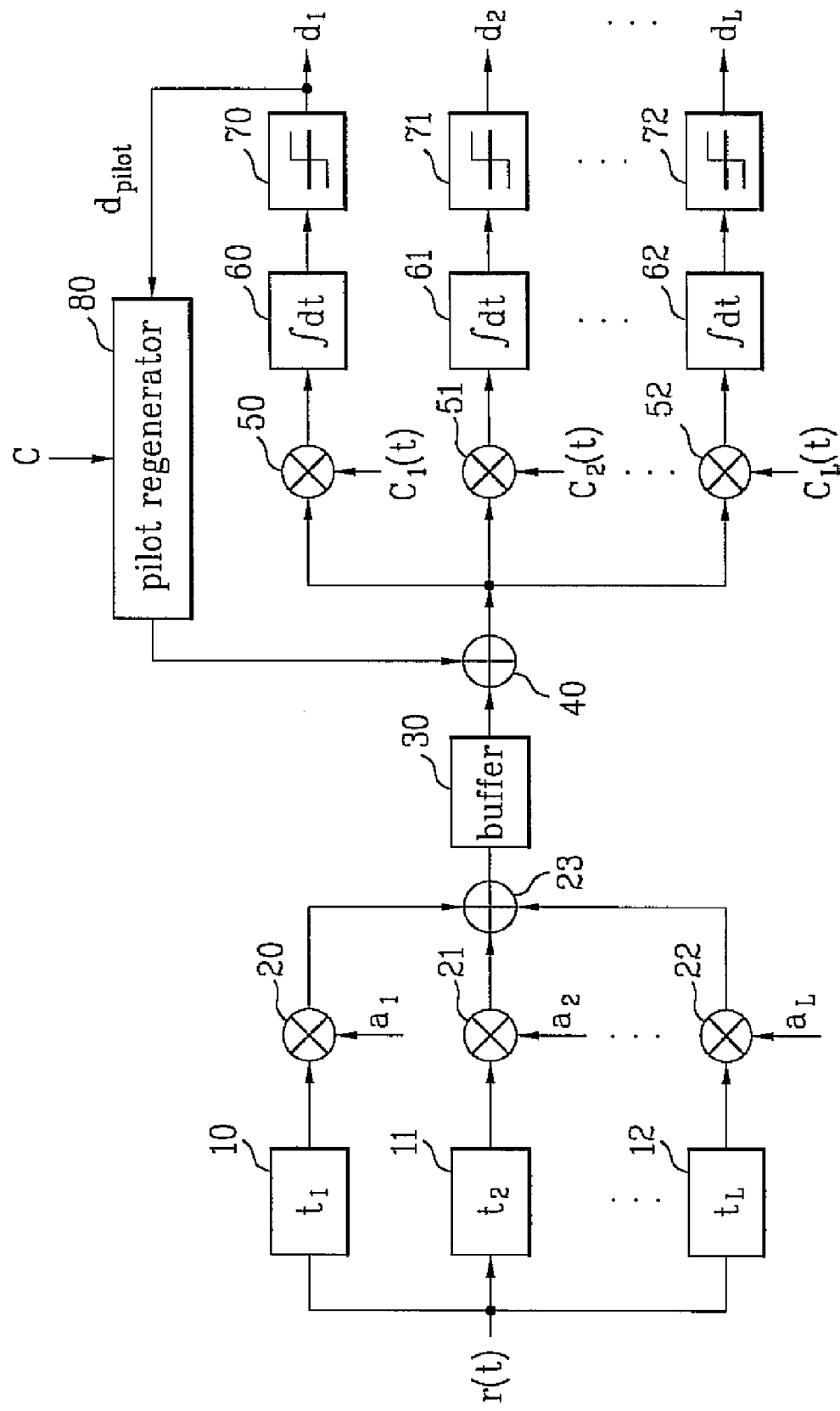
FIG. 1 illustrates the configuration of a receiver for canceling pilot signal interference according to one embodiment of the present invention.

Reference will now be made in detail to preferred embodiments of an interference cancellation method and a communication terminal for the same according to the present invention, examples of which are illustrated in the accompanying drawings. Wherever possible, the same reference numbers will be used throughout the drawings to refer to the same or like parts.

The above and other objects, features and other advantages of the present invention will be more clearly understood from the following detailed description taken in conjunction with the accompanying drawings. The configuration and operation of the embodiments of the present invention will be described with reference to the accompanying drawings. The configuration and operation of the present invention shown in the drawings and described hereinafter will be described in at least one embodiment, without limiting the spirit and scope of the present invention.

FIG. 1 illustrates the configuration of a receiver 1 for canceling pilot signal interference according to one embodiment of the present invention. The receiver 1 is provided in a communication terminal that can receive broadcast signals and also can decode and reproduce the broadcast signals.

As illustrated in FIG. 1, the receiver 1 has multiple paths for reception. The receiver 1 includes components that perform multiple path processing on signals, such as pilot and broadcast signals, received through the multiple paths.

The components for performing multiple path processing include delayers 10-12, first to third mixers 20-22 and a first adder 23. The delayers 10-12 function to synchronize delay times of signals that have been received with different delays since they have been received through the multiple paths. The first to third mixers 20-22 mix path gains, such as signal amplitudes and phases, with outputs of the delayers 10-12. The first adder 23 adds the outputs of the first to third mixers 20-22.

The receiver 1 also includes a buffer 30 to temporarily store an output of the first adder 23, which is a result of the multiple path processing, components for performing decoding processes such as estimation and decision of received signals (including pilot and broadcast signals) and components for removing the pilot signal affect on the output of the first adder 23.

The components for performing decoding processes include fourth to sixth mixers 50-52, first to third matched filters 60-62 and first to third determination blocks 70-72. The fourth to sixth mixers 50-52 mix orthogonal codes allocated to the mixers 50-52 with the received signal input to the mixers 50-52. The first to third matched filters 60-62 perform matched filtering on outputs of the fourth to sixth mixers 50-52. The first to third determination blocks 70-72 perform determination operations on outputs of the first to third matched filters 60-62.

The components for removing the pilot signal include a pilot regenerator 80, a controller (not shown) and a second adder 40. The pilot regenerator 80 regenerates a pilot signal from an output of one of the first to third determination blocks 70-72. The controller controls the operation of the pilot regenerator 80 according to reception quality of the broadcast signal. The second adder 40 subtracts the output of the pilot regenerator 80 from the output of the buffer 30.

Figure 2:
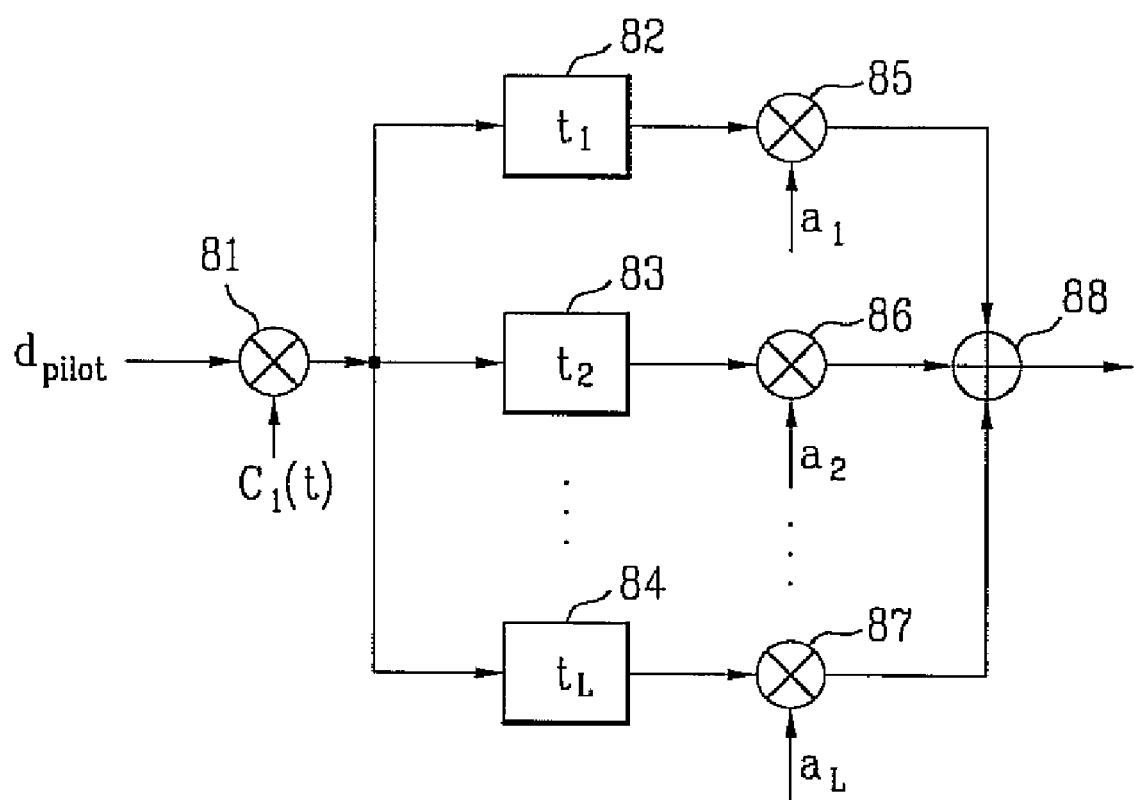
FIG. 2 illustrates a detailed configuration of a pilot regenerator in the receiver of FIG. 1.

FIG. 2 illustrates a detailed configuration of a pilot regenerator 80 in the receiver 1 of FIG. 1. As illustrated in FIG. 2, the pilot regenerator 80 includes a seventh mixer 81, delayers 82-84, eighth to tenth mixers 85-87 and a third adder 88.

The seventh mixer 81 mixes an orthogonal code allocated to the pilot channel with the output of one of the first to third determination blocks 70-72 as illustrated in FIG. 1, or in other words, with the result of decoding the pilot signal. The delayers 82-84 function to synchronize delay times of pilot signals on a plurality of paths after the output of the seventh mixer 81 is separated into the pilot signals corresponding to the paths. The eighth to tenth mixers 85-87 mix path gains, such as signal amplitudes and phases, with outputs of the delayers 82-84. The third adder 88 adds outputs of the eighth to tenth mixers 85-87.

Received signals include pilot and broadcast signals. The received signals r(t) have different delay times since they have been received through multiple paths. The received signals r(t) are separated according to the delay times. The received signal r(t) refers to a signal that has been received at time "t".

The delayers 10-12 synchronize delay times of signals received via 'L' multiple paths at different times due to multiplexing. In other words, the delayers 10-12 perform timing synchronization.

The first to third mixers 20-22 mix path gains, such as signal amplitudes and phases, with outputs of the delayers 10-12. The first adder 23 adds outputs of the first to third mixers 20-22. The output of the first adder 23, which is the result of multiple path processing, is temporarily stored in the buffer 30.

The output of the buffer 30 is transferred to a plurality of decoding paths. Orthogonal codes allocated to the decoding paths are used for the decoding paths.

On each of the decoding paths, the received signal is despread using an orthogonal code allocated to the decoding path and an effective signal, such as a pilot or broadcast signal, is detected through the despreading result. It is assumed that one of the decoding paths, which uses an 0th orthogonal code $C_1(t)$, is a path for decoding the pilot signal. It is also assumed that the decoding paths that use the remaining orthogonal codes $C_2(t)$ to $C_K(t)$ are paths for decoding broadcast signals, where "K" is the number of received channels.

The fourth to sixth mixers 50-52, which are provided on the decoding paths, mix orthogonal codes allocated to the mixers 50-52 with the output of the buffer 30. Therefore, the fourth to sixth mixers 50-52 output signals suitable for their decoding paths. The received signal is separated into a pilot signal and broadcast signals via the fourth to sixth mixers 50-52.

The first to third matched filters 60-62 perform matched filtering on the outputs of the fourth to sixth mixers 50-52. A mixer and a matched filter on each of the decoding paths perform a correlation process on the received signal, such as a pilot or broadcast signal, to estimate the received signal.

The first to third determination blocks 70-72 perform hard decision operations on outputs of the first to third matched filters 60-62. The first to third determination blocks 70-72 output decoding results $d_1, d_2, \ldots, d_k$. The output $d_1$ of the first determination block 70 is the decoded pilot signal $d_{pilot}$.

The controller (not shown) provided in the receiver 1 determines the reception quality of broadcast signals using the outputs $d_2, d_3, \ldots, d_k$ of the determination blocks 71, 72 other than the first determination block 70. The Bit Error Rate (BER) of the received broadcast signals is used to determine the reception quality. Specifically, the BER of the outputs of the second and third determination blocks 71, 72 is compared with predetermined thresholds.

The controller (not shown) determines whether or not to activate the pilot regenerator 80. More specifically, if the decoded broadcast signals have a high reception quality, the controller provides a control signal C to deactivate the pilot regenerator 80. On the other hand, if the decoded broadcast signals have a low reception quality, the controller provides a control signal C to activate to the pilot regenerator 80. The pilot regenerator 80 may be activated constantly regardless of the reception quality of the decoded broadcast signals.

When activated, the pilot regenerator 80 uses the output of the first determination block 70, specifically the decoded pilot signal received at time t. The regenerator 80 also uses channel information such as the gain of the pilot channel.

The output $d_{pilot}$ of the first determination block 70 is input to the pilot regenerator 80. The seventh mixer 81 in the pilot regenerator 80 mixes the orthogonal code $C_1(t)$ allocated to the pilot channel with the input signal $d_{pilot}$.

The output of the seventh mixer 81 is separated into signals corresponding to the paths. The delayers 82-84 synchronize delay times of the separated pilot signals on the paths.

The eighth to tenth mixers 85-87 mix gains, such as signal amplitudes and phases, of the pilot channels with the outputs of the delayers 82-84. The third adder 88 sums the outputs of the eighth to tenth mixers 85-87 and outputs the resulting value to the second adder 40.

In the present invention, the decoded pilot signal is extracted from the decoded received signal and the extracted decoded pilot signal is used to regenerate a pilot signal. Specifically, the pilot regenerator 80 regenerates a pilot signal using the output $d_{pilot}$ of the first determination block 70, the orthogonal code allocated to the pilot channel and channel information of the pilot channel.

The second adder 40 then subtracts the output of the third adder 88 from a signal received at time (t+1), which is currently output from the buffer 30. This subtraction removes the pilot signal from the signal received of time (t+1).

The orthogonal codes used in the above method are preferably Walsh codes. When determining the reception quality of the broadcast signals in order to determine whether to remove the pilot signal, the controller (not shown) uses a plurality of thresholds that have hysteresis loop characteristics. The thresholds prevent frequent on/off switching of the components, for example, the pilot regenerator and the second adder, that operate to remove the pilot signal.

In one example, the controller uses an upper threshold and a lower threshold, where the lower threshold is lower than the upper threshold. When the reception quality of the broadcast signal is not higher than the lower threshold, the controller outputs a control signal C for removing the pilot signal. This control signal activates the pilot regenerator 80.

Therefore, the pilot regenerator 80 regenerates a pilot signal using the decoded pilot signal at time "t" and channel information of the pilot channel. The regenerated pilot signal is subtracted from the signal received at time "t+1".

This pilot signal cancellation operation is repeated until the reception quality of the broadcast signal reaches the upper threshold. In other words, the pilot regenerator 80 is activated until the reception quality of the broadcast signal exceeds the upper threshold. During the pilot signal cancellation operation, only the operation of decoding the broadcast signal is performed.

Thereafter, when the reception quality of the broadcast signal has exceeded the upper threshold, the controller (not shown) outputs a control signal C for stopping the pilot signal cancellation. This control signal deactivates the pilot regenerator 80.

On all the decoding paths, a received signal including pilot and broadcast signals is despread using orthogonal codes allocated to the decoding paths and effective signals are extracted from the despreading result. This received signal decoding operation is continued until the reception quality of the broadcast signal drops below the lower threshold.

Figure 3:
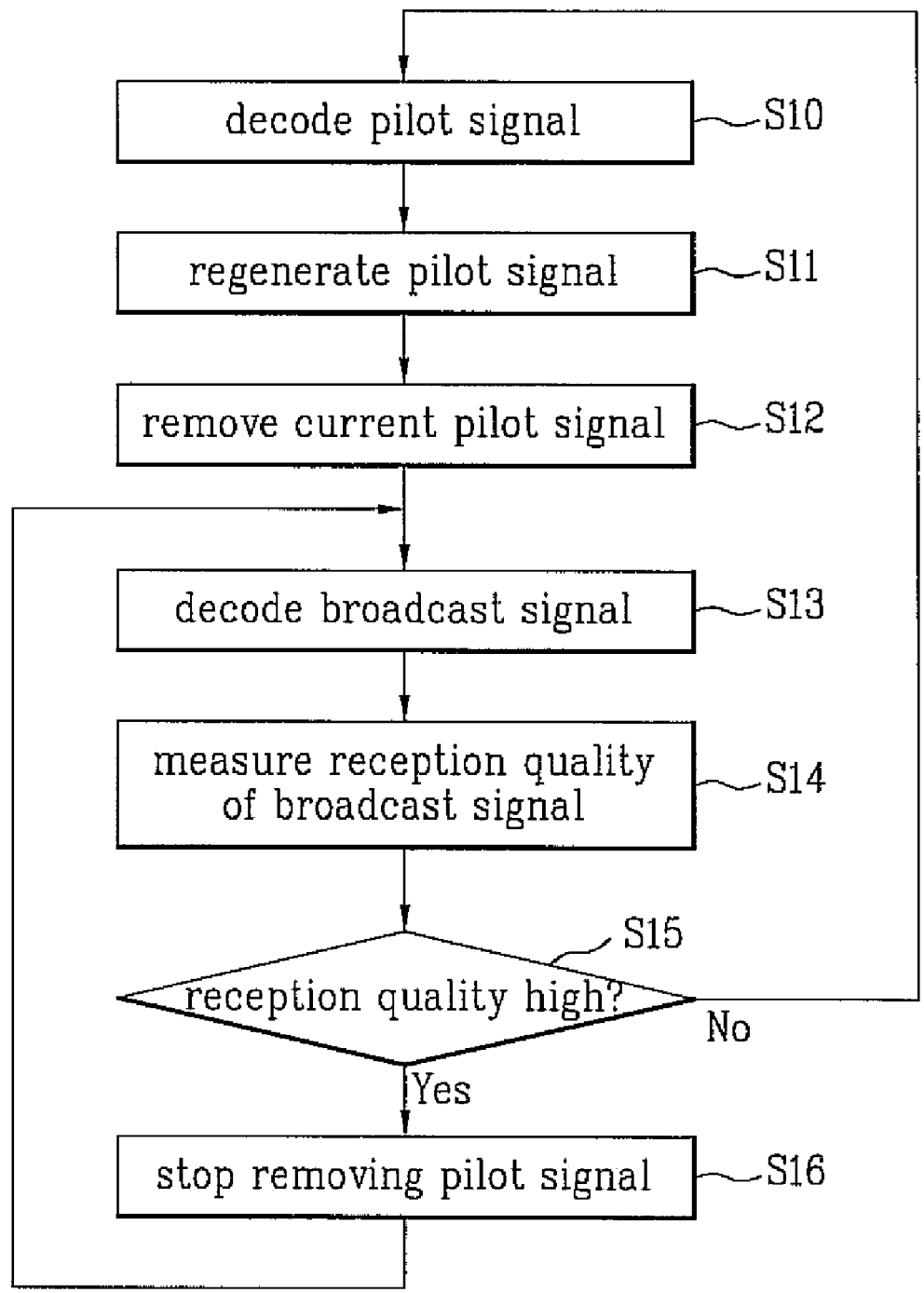
FIG. 3 is a flow chart of a method for canceling pilot signal interference according to one embodiment of the present invention.

FIG. 3 is a flow chart of a method for canceling pilot signal interference according to the present invention. As illustrated in FIG. 3, the receiver 1 receives a signal via multiple paths and decodes the received signal (S10).

More specifically, in order to cancel pilot signal interference from the received signal including pilot and broadcast signals, the pilot signal is decoded and the broadcast signals that have lower transmission power than the pilot signal are also decoded. The reception quality of the broadcast signals is measured using the decoded broadcast signals and it is then determined according to the measured quality whether to perform an operation for removing the pilot signal.

If the operation for removing the pilot signal is performed, the receiver then regenerates a pilot signal using the decoded pilot signal at reception time "t" and channel information of the pilot channel, such as channel gain, amplitude and phase information (S11).

Thereafter, the regenerated pilot signal is subtracted from a signal received via multiple paths at reception time "t+1". Thus, the pilot signal is removed from the signal received at reception time "t+1" (S12).

The received signal, which is the broadcast signal from which the pilot signal has been removed, is then decoded (S13). The reception quality of the broadcast signals at reception time "t+1" is measured using the decoded broadcast signal (S14).

When the measured reception quality exceeds a predetermined threshold, it is determined that the reception quality of the broadcast signals is high and the receiver ceases the pilot signal cancellation operation (S16). At this time, the block for regenerating the pilot signal is deactivated. On the other hand, when the measured reception quality does not exceed the predetermined threshold, it is determined that the reception quality of the broadcast signals is low and the receiver performs the series of processes (S10-S14) for removing the pilot signal.

The present invention regenerates a pilot signal whose transmission power is higher than that of broadcast signals in order to remove the pilot signal. In this way, interference caused by the pilot signal is prevented when detecting broadcast signals having transmission power lower than the pilot signal.

As is apparent from the above description, the present invention facilitates further increasing the transmission power of a pilot channel used to transmit more important information than CDM channels. For example, transmission power greater than the conventionally used transmission power, which is 3 dB higher than CDM channels, may be used for the pilot channel. This allows more accurate estimation of information required for decoding of channel information included in the pilot signal.

Removing the pilot signal according to the present invention decreases the error rate of broadcast signals. Therefore, the reception quality of broadcast signals is improved by removing the pilot signal, which would otherwise cause interference with the broadcast signals.

The present invention can also be applied to DMB to efficiently remove pilot signals that would otherwise cause interference to DMB signals. Therefore, the present invention can also improve the reception quality of DMB signals.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An interference cancellation method, comprising:
    decoding, in a decoding unit, a signal received at a certain reception time, the received signal including a broadcast signal and a pilot signal;
    regenerating, in a regenerating unit, a pilot signal using a decoding result of the pilot signal and channel information of a pilot channel, wherein the decoding result of the pilot signal is extracted from a decoding result of the received signal;
    removing, in a removal unit, a pilot signal from a signal received at a next reception time based on the regenerated pilot signal;
    measuring, in a measuring unit, reception quality of the broadcast signal included in the received signal; and
    determining, in the measuring unit, whether to remove the pilot signal based on the measured reception quality,
    wherein the measuring unit determines whether to remove the pilot signal by comparing the measured reception quality with a plurality of thresholds,
    wherein comparing the measured reception quality with a plurality of thresholds prevents frequent on/off switching of the regenerating unit and the removal unit.

2. The method of claim 1, wherein the plurality of thresholds comprise upper and lower thresholds that have hysteresis loop characteristics, the upper threshold being higher than the lower threshold.

3. The method of claim 2, further comprising ceasing the removal of the pilot signal when the measured reception quality exceeds the upper threshold.

4. The method of claim 2, further comprising repeating the removal of the pilot signal until the measured reception reaches the upper threshold.

5. A communication terminal, comprising:
    a decoding unit adapted to decode a signal received at a certain reception time, the received signal including a broadcast signal and a pilot signal;
    a regenerating unit adapted to regenerate a pilot signal using an output of the decoding unit and channel information of a pilot channel, wherein a decoding result of the pilot signal is extracted from a decoding result of the received signal;
    a removal unit adapted to remove a pilot signal from a signal received at a next reception time based on the regenerated pilot signal; and
    a measuring unit adapted to measure reception quality of a broadcast signal included in the signal received at the next reception time and control the regenerating unit and the removal unit according to the measured reception quality,
    wherein the measuring unit controls the regenerating unit and the removal unit by comparing the measured reception quality with a plurality of thresholds,
    wherein comparing the measured reception quality with a plurality of thresholds prevents frequent on/off switching of the regenerating unit and the removal unit.

6. The communication terminal of claim 5, wherein the regenerating unit is further adapted to mix an orthogonal code allocated to a pilot channel with the decoded pilot signal from the decoding unit and regenerate the pilot signal by mixing information of the pilot channel with the mixed signal.

7. The communication terminal of claim 5, wherein the removal unit is further adapted to subtract the regenerated pilot signal from the signal received at the next reception time.

8. The communication terminal of claim 5, wherein the measuring unit is further adapted to determine whether to activate the regenerating unit by comparing the measured reception quality with the plurality of thresholds.

9. The communication terminal of claim 8, wherein the plurality of thresholds comprise upper and lower thresholds that have hysteresis loop characteristics, the upper threshold being higher than the lower threshold.

10. The communication terminal of claim 9, wherein the measuring unit is further adapted to deactivate the regenerating unit if the measured reception quality exceeds the upper threshold.

11. The communication terminal of claim 9, wherein the measuring unit is further adapted to activate the regenerating unit until the measured reception quality reaches the upper threshold.

* * * * *